Nov. 3, 1959  C. K. GRIEDER  2,911,226
GALLOPING HOBBY HORSE
Filed Sept. 16, 1958  2 Sheets-Sheet 1
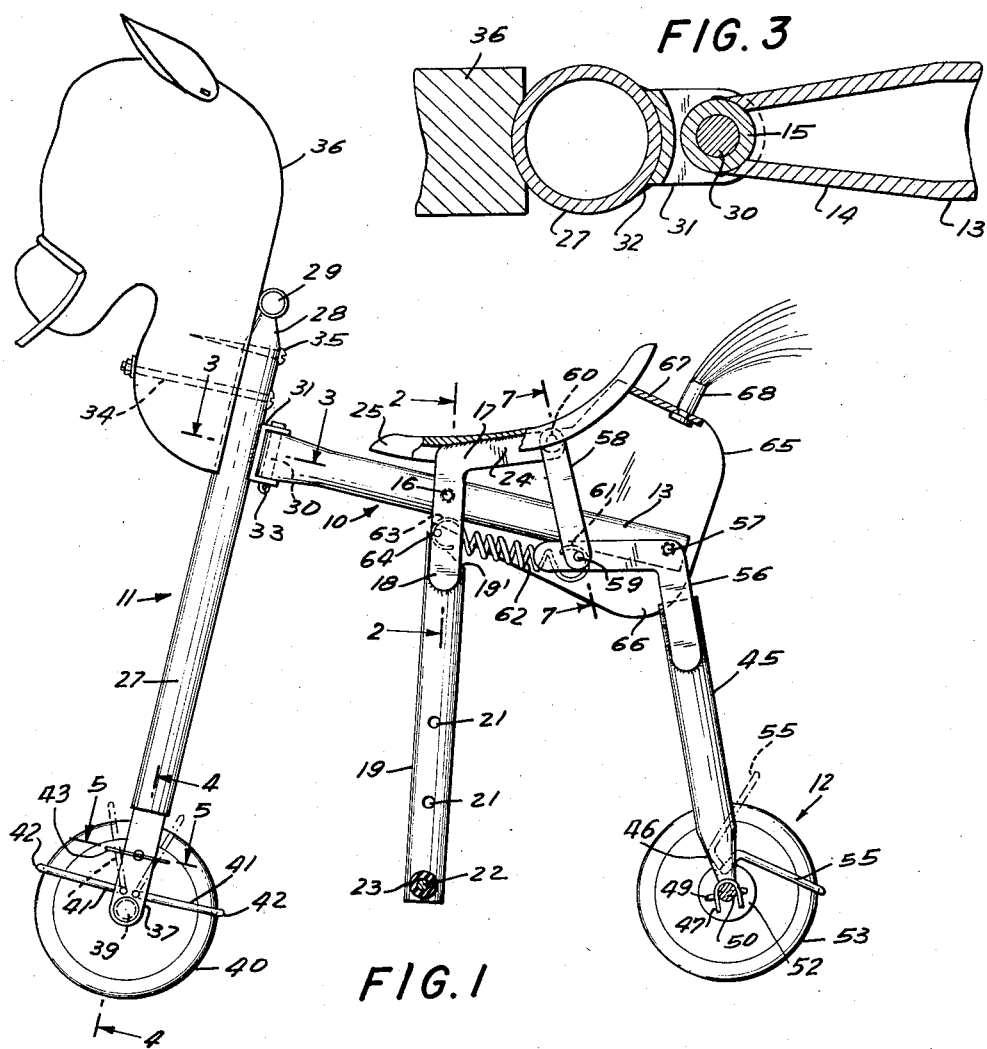
FIG. 3
FIG. 1
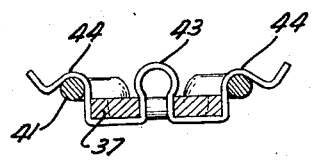
FIG. 5
INVENTOR.
CHARLES K. GRIEDER
BY
*Howard R. Thompson*
ATTORNEY Nov. 3, 1959 — C. K. GRIEDER — 2,911,226
GALLOPING HOBBY HORSE
Filed Sept. 16, 1958 — 2 Sheets-Sheet 2
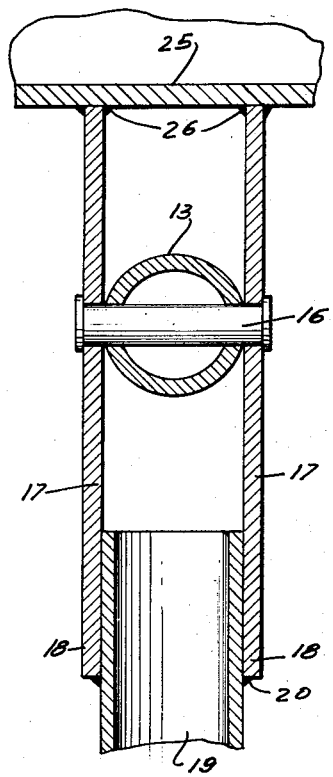
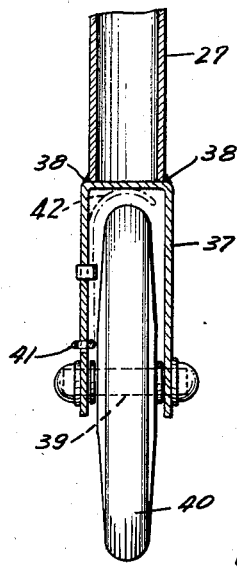
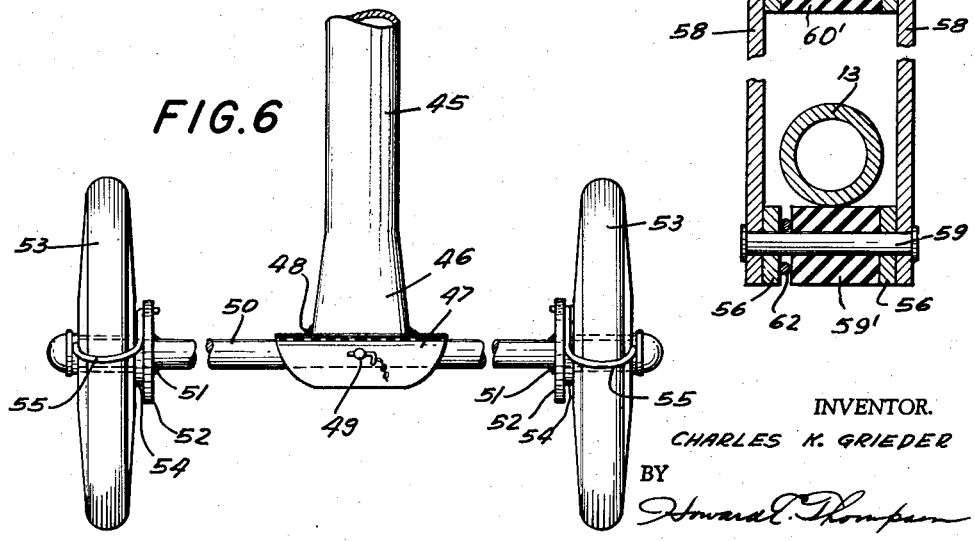
INVENTOR.
CHARLES K. GRIEDER
BY
ATTORNEY

United States Patent Office 2,911,226
Patented Nov. 3, 1959

2,911,226

GALLOPING HOBBY HORSE

Charles K. Grieder, Oakland, N.J.

Application September 16, 1958, Serial No. 761,324

13 Claims. (Cl. 280—1.183)

This invention relates to what I term a galloping hobby horse which can, in reality, be a galloping mechanical vehicle or mechanism, characterized in any desired manner. More particularly, the invention deals with a mechanism of the character described, wherein the main framework of the mechanism is formed of light tubing, plus a series of brackets and links coupling the seat portion of the mechanism with the frame in providing the galloping movement to the mechanism.

Still more particularly, the invention deals with a structure of the character described, wherein the framework includes a pair of rear wheel members and a single front wheel member, with means for braking the wheels in controlling forward and reverse movement of the mechanism, as well as normal coasting of the mechanism.

Still further, the invention deals with a mechanism of the character described, wherein parts are detachably mounted for reasonably compact packaging of the mechanism for storage and shipment.

The novel features of the invention will be best understood from the following description, when taken together with the accompanying drawing, in which certain embodiments of the invention are disclosed and, in which, the separate parts are designated by suitable reference characters in each of the views and, in which:

Figure 1 is a side view of a device made according to my invention, with parts of the construction broken away and in section and parts shown in different positions in dot-dash lines.

Fig. 2 is an enlarged section substantially on the line 2—2 of Fig. 1.

Fig. 3 is an enlarged partial section on the line 3—3 of Fig. 1.

Fig. 4 is an enlarged section on the line 4—4 of Fig. 1 showing the wheel in elevation.

Fig. 5 is an enlarged section on the line 5—5 of Fig. 1.

Fig. 6 is an enlarged rear view, with parts of the construction broken away, showing primarily the rear wheel mounting and coupling with the rear frame member; and Fig. 7 is a partial broken section on the line 7—7 of Fig. 1 on an enlarged scale.

Considering Fig. 1 of the drawing, my improved device or mechanism is formed of three primary detachably coupled units, namely the body unit 10, the front wheel unit 11 and the rear wheel unit 12. The unit 10 comprises an elongated tubular body member 13, one end of which is contracted, as indicated at 14 in Fig. 3 of the drawing, and welded to a bearing sleeve 15.

Pivoted substantially centrally to the body member 13 on a pivot pin 16, note Fig. 2, are a pair of substantially L-shaped brackets 17, the depending portions 18 of the brackets being welded to a tubular stirrup support or fender 19, the welds being diagrammatically illustrated at 20 in Fig. 2 of the drawing.

The fender 19 has a series of vertically spaced apertures 21 for reception of a stirrup pin 22, which protrudes beyond opposed sides of the fender 19 and arranged on opposed sides of the pin are rubber treads, one of which is seen at 23 in Fig. 1 of the drawing. These treads are removable from the pin 22 in adjusting the pin in the several apertures 21 employed.

The horizontal portions 24 of the bracket 17 are welded to a seat 25, these welds being diagrammatically illustrated at 26 in Fig. 2 of the drawing. It will, thus, be seen that the seat, plus the brackets 17 and the fender 19 become one unitary construction, all swingable about the pivot 16.

The unit 11 comprises an elongated tube or post 27, to the upper contracted end 28 of which is fixed a crosshandle bar 29 to be gripped by the operator in controlling direction of travel of the device by rotation on a pin 30 detachably mounted in the sleeve 15 and in a bracket 31 welded to the tube 27, as diagrammatically illustrated at 32 in Fig. 3 of the drawing. The bracket 31 is generally U-shaped in form, as clearly noted in Fig. 1 of the drawing, and a removable cotter pin or the like 33 controls detachable coupling of the unit 11 with the unit 10. Fixed to the outer surface of the tube 27, adjacent the upper end thereof through the medium of a bolt 34 and screw 35, is any suitable characterization of an animal 36, the outline of a horse's head and neck being diagrammatically illustrated in showing one adaptation and use of my invention.

Welded to the lower end of the tube 27 is a wheel supporting yoke 37, the weld being diagrammatically seen at 38 in Fig. 4 of the drawing. The yoke forms a support for a front axle 39, upon which the front wheel 40 is rotatably mounted.

Pivotally mounted in connection with the yoke, adjacent the axle 39, are a pair of similar brake members 41, having ends 42 adapted to overlie the periphery of the wheel 40, seen in operative position as shown in full lines in Fig. 1 of the drawing and will be supported in raised inoperative position, as indicated in dot-dash lines by a double spring clip 43, note Fig. 5 of the drawing. The clip is mounted in one side of the yoke 37 and has, at opposed sides of the yoke, the spring coupling ends 44, into which the brake members 41 are adapted to be snapped and, in Fig. 5, these members 41 are shown in their dotted line position of Fig. 1 of the drawing, in other words, operatively engaged by the coupling ends 44.

At the rear of the body unit is a tubular frame member 45, to the lower contracted end 46 of which is welded an elongated U-shaped bearing plate 47, this welding being diagrammatically illustrated at 48 in Fig. 6 of the drawing. The plate is apertured to receive a coupling pin 49, which passes through the rear axle or shaft 50 of the unit 12. The shaft 50 is snugly engaged by the plate 47, as clearly noted in Fig. 1 of the drawing. The pin 49 provides the detachable coupling of the unit 12 with respect to the frame member 45. In this connection, it will be apparent that the frame member 45 and its associated parts, some of which will be later described, constitute part of the unit 10.

Welded to end portions of the shaft 50, as seen at 51, Fig. 6, are discs 52, between which and the rear wheels 53 are arranged spacer collars 54. Pivoted to the discs 52 are brake elements 55, generally of the construction shown in Figs. 1 and 6 of the drawing for operatively engaging the periphery of the wheels 53 in providing a braking action. The elements 55 are movable into the raised inoperative position noted in Fig. 1 of the drawing and any suitable means can be employed for support of the same in this raised position.

Welded to outer surfaces of the frame member 45, at the upper end thereof, are a pair of L-shaped brackets 56, generally of the contour of the brackets 17, the brackets 56 being pivoted, as seen at 57, to the rear end of the tube 13 on pivots, which will be generally similar to the pivots 16 and, therefore, no further detail showing is made thereof.

Pivotally coupling the brackets 17 and 56 are links 58, preferably arranged upon outer surfaces of the brackets to clear the frame member 13. The pivot of the links 58 with the brackets 56 is by way of a crosspin 59 and a similar pin 60 pivots the links with the brackets 17. Mounted on the pins 59 and 60 are rubber bumpers 59', 60', which operatively engage the frame 13 in checking upward and downward movement of the seat 25.

Mounted on the pin 59 is one end 61 of a spring 62, the other end 63 of which is coupled with a pin 64 fixed to the depending portions 18 of the brackets 17. It will be noted that 19 is cutaway, as seen at 19', to provide free movement of the spring 62. The spring 62 normally supports the parts of the device in the position shown in Fig. 1; whereas, when the seat 25 is moved downwardly by the operator, either the rear wheels 53 will be moved rearwardly, or the front wheel 40 will be moved forwardly, depending upon the setting of the brake elements 41, 55.

As the operator raises on the stirrups 22, the spring 62 will again draw the structure to the position of Fig. 1 and this operation will be repeated to either move the device forwardly or rearwardly.

A U-shaped hood 65 is suitably fixed to the seat and brackets 17 to provide side closure plates, one of which is indicated at 66 in Fig. 1 of the drawing, simply to conceal the mechanism of the device and prevent the occupant from coming in direct contact therewith, the crosshead of the hood being indicated in section at 67 in Fig. 1 and is disposed at the upper part of the hood adjacent and rearwardly of the seat 25 and fixed to the crosshead is a device 68 for representation of a tail, which could be, for example, a horse tail.

As operation of devices of the type and kind under consideration utilizing the braking elements 41, 55 are well known in the art, no detailed description of operation is deemed to be necessary more than to say that, when these elements are all in raised position, the device becomes a free-wheeling toy; the brake elements can be operated to move the device forwardly and backwardly or can be positioned to provide simply a non-movable rocking-type of device.

In all instances, it is the lowering or dropping of the weight of the body upon the seat that provides the rocking or advancing movement; whereas, raising the body by pressure upon the stirrups allows the spring 62 to contract the various members, preparatory to the next operation performed by renewing pressure of the body upon the seat. In operation, it will appear that the fender 19 moves in unison with the seat and, as the seat moves downwardly, the rear wheel moves rearwardly, which results in a downward movement of the tubular body; whereas, in upward movement of the parts, the seat will again draw the rear wheel inwardly or forwardly and, accordingly, raise the tubular body. This motion similates the actual movement of the body in riding a horse.

By reason of the simplicity and economy of construction, a device of the character described can be produced at a nominal cost, thus minimizing the retail selling price. Notwithstanding its simplicity and economy, the device will be strong and durable and relatively light in construction. Furthermore, it will be understood that, by detachable coupling of the units, the device can be conveniently packed and stored and transported in a condition occupying a minimum amount of space.

Having fully described my invention, what I claim as new and desire to secure by Letters Patent is:

1. A vehicle of the character described, comprising three detachably coupled units, namely a body unit, a front wheel unit and a rear wheel unit, said body unit comprising an elongated tubular body member, a rear wheel supporting tubular frame member, means pivotally coupling said frame member with the rear end of said body member, means pivotally mounting a seat substantially centrally of the body member, said means including a downwardly extending tubular stirrup support, said front wheel unit comprising a depending tubular post, means at the upper end portion of the post for pivotally coupling the same with the forward end of the tubular body member, a handle bar fixed to the upper end of the post, a characterized head element fixed to and projecting forwardly and upwardly with respect to the upper end of the post, means for supporting a front wheel at the lower end of said post, said rear wheel unit comprising an elongated axle having wheels mounted on end portions thereof, means comprising an elongated U-shaped bearing plate at the lower end of said tubular frame member for detachably coupling the same centrally with said axle, the means pivotally coupling the seat and tubular frame member with the tubular body member comprising L-shaped brackets, a linkage for coupling said brackets to transmit movement of the seat to the rear wheel unit in pivotal movement of the seat on said tubular body member, and tensional means in operative engagement with said tubular frame member and second named means for normally maintaining the seat in raised position with respect to said tubular body member.

2. A vehicle as defined in claim 1, wherein cushioning elements are provided for cooperation with said tubular body member in cushioning upward and downward movement of the seat in operation of the vehicle.

3. A vehicle as defined in claim 1, wherein the coupling of the lower end of the post with the axis of the front wheel comprises a yoke fixed to the lower end of the post, a pair of brake members pivoted to one side of the yoke and operatively engaging said front wheel, and a dual spring clip on said side of the yoke for support of said brake members in raised inoperative position.

4. A vehicle as defined in claim 1, wherein the pivotal coupling of the front leg unit with the body unit comprises a yoke-shaped bracket, a pin detachably supported in the bracket, and said pin fitting in a bearing collar at the forward end of the body member.

5. A vehicle as defined in claim 1, wherein the axle of said rear wheel unit includes means fixed thereto adjacent the wheels of said unit, and brake members pivoted to said means and adapted to operatively engage the rear wheels in controlling movement thereof.

6. A vehicle as defined in claim 1, wherein said L-shaped brackets are arranged in pairs, one pair being fixed to opposed sides of the stirrup support, and the other pair being fixed to opposed sides of the tubular frame member.

7. A vehicle as defined in claim 6, wherein one leg of the first named pair of brackets is fixed to said seat.

8. A vehicle as defined in claim 7, wherein a yoke-shaped hood is mounted in connection with the seat, the hood including depending side walls forming a closure to a major portion of the mechanism of the vehicle, the hood having a crosshead portion at the rear of the seat, and an animal tail mounted in connection with said crosshead.

9. A vehicle as defined in claim 1, wherein said tensional means comprises a coil spring extending between end portions of said pairs of brackets.

10. A vehicle as defined in claim 1, wherein said stirrup support has a plurality of vertically spaced apertures, and a stirrup pin detachable with respect to the apertures of said support.

11. A vehicle of the character described, comprising a body unit employing a one-piece tubular frame, a tubular front wheel unit and a rear wheel supporting unit, a tubular frame member pivotally coupling the rear wheel unit with the tubular frame of the body unit, means detachably coupling the rear wheel unit with the lower end of said tubular frame member, means pivotally and detachably coupling the front wheel tubular unit with the forward end of the tubular frame of the body unit, a seat, a tubular stirrup support depending from the frame of said body unit, means coupling the stirrup support with the seat, said last named means including means pivotally mounting the same in connection with the tubular frame of the body unit, a linkage between the seat and the tubular frame member supporting said rear wheel, and tensional means in operative engagement with the upper portions of the stirrup support and said tubular frame member for normally supporting the seat in raised position with respect to said body frame member.

12. A vehicle as defined in claim 11, wherein the front and rear wheels of the vehicle include braking means controlling movement of the vehicle in operation thereof, a characterized head fixed to the upper end of the front wheel unit, and means including a hood fixed to the seat and housing mechanism of the vehicle beneath the seat for support of a tail adjacent and rearwardly of the seat.

13. In a vehicle of the character described, an elongated one-piece substantially straight body part, a front wheel unit swingably mounted directly in connection with the forward end of the body part, a rear wheel unit having means for pivotally coupling the same directly with the rear portion of said body part, a seat and stirrup support assemblage directly pivoted to the body part intermediate its ends, a linkage between said assemblage and said means, tensional means coupling the assemblage with said means in normally maintaining the assemblage with the seat thereof in raised position with respect to the body part, and the stirrup support of said assemblage including a stirrup adjustably positioned longitudinally of the support.

References Cited in the file of this patent
UNITED STATES PATENTS 2,635,886    Schoebel _____ Apr. 21, 1953

FOREIGN PATENTS 627,011    Great Britain _____ July 26, 1949